United States Patent
Kumano et al.

(10) Patent No.: US 11,840,233 B2
(45) Date of Patent: Dec. 12, 2023

(54) TRAVELING LANE ESTIMATION APPARATUS, TRAVELING LANE ESTIMATION METHOD, AND COMPUTER-READABLE NON-TEMPORARY STORAGE MEDIUM STORING CONTROL PROGRAM

(71) Applicant: DENSO CORPORATION, Kariya (JP)

(72) Inventors: Shunya Kumano, Nisshin (JP); Takeshi Shikimachi, Kariya (JP); Hiroki Ukai, Kariya (JP)

(73) Assignee: DENSO CORPORATION, Kariya (JP)

( * ) Notice: Subject to any disclaimer, the term of this patent is extended or adjusted under 35 U.S.C. 154(b) by 457 days.

(21) Appl. No.: 17/202,766

(22) Filed: Mar. 16, 2021

(65) Prior Publication Data

US 2021/0197828 A1 Jul. 1, 2021

Related U.S. Application Data

(63) Continuation of application No. PCT/JP2019/032649, filed on Aug. 21, 2019.

(30) Foreign Application Priority Data

Oct. 1, 2018 (JP) ................. 2018-186673

(51) Int. Cl.
| | |
|---|---|
| B60T 7/12 | (2006.01) |
| B60T 8/17 | (2006.01) |
| B60W 30/18 | (2012.01) |
| G01C 21/26 | (2006.01) |
| G06V 20/56 | (2022.01) |
| G06V 20/58 | (2022.01) |
| G08G 1/16 | (2006.01) |

(52) U.S. Cl.
CPC ....... *B60W 30/18163* (2013.01); *G06V 20/58* (2022.01); *G06V 20/588* (2022.01); *B60W 2552/10* (2020.02); *B60W 2552/53* (2020.02)

(58) Field of Classification Search
CPC ....... B60W 30/18163; B60W 2552/10; B60W 2552/53; B60T 7/12; B60T 8/17; G01C 21/26; G08G 1/16; G06V 20/58; G06V 20/588
USPC .......................................... 701/96
See application file for complete search history.

(56) References Cited

U.S. PATENT DOCUMENTS

2010/0246889 A1 9/2010 Nara et al.
2017/0183007 A1* 6/2017 Oh .................. B60W 30/16
(Continued)

FOREIGN PATENT DOCUMENTS

JP 2010221859 A 10/2010

*Primary Examiner* — Abby Y Lin
*Assistant Examiner* — Hossam M Abd El Latif
(74) *Attorney, Agent, or Firm* — Harness, Dickey & Pierce, P.L.C.

(57) ABSTRACT

By a traveling lane estimation apparatus, a traveling lane estimation method, a control program, a computer-readable non-temporary storage medium, a front vehicle is recognized based on a sensing result by a periphery monitoring sensor, a front vehicle traveling trajectory is estimated based on a front vehicle position, map data including lane number information is acquired; a subject vehicle position on a map is identified, an inappropriate traveling trajectory for estimating the subject vehicle traveling lane is determined; and the subject vehicle traveling lane is estimated.

13 Claims, 10 Drawing Sheets

(56) References Cited

U.S. PATENT DOCUMENTS

2018/0037112 A1* 2/2018 Otake ................ F16D 65/186
2018/0174459 A1* 6/2018 Oh .................... B60W 30/10
2019/0197038 A1* 6/2019 Mori ................... G06N 7/01

* cited by examiner

TRAVELING LANE ESTIMATION APPARATUS, TRAVELING LANE ESTIMATION METHOD, AND COMPUTER-READABLE NON-TEMPORARY STORAGE MEDIUM STORING CONTROL PROGRAM

CROSS REFERENCE TO RELATED APPLICATIONS

The present application is a continuation application of International Patent Application No. PCT/JP2019/032649 filed on Aug. 21, 2019, which designated the U.S. and claims the benefit of priority from Japanese Patent Application No. 2018-186673 filed on Oct. 1, 2018. The entire disclosures of all of the above applications are incorporated herein by reference.

TECHNICAL FIELD

The present disclosure relates to a traveling lane estimation apparatus, a traveling lane estimation method, a control program, a computer-readable non-temporary storage medium for estimating a subject vehicle traveling lane.

BACKGROUND

In a technology of a comparative example, an image recognition process portion receives a movie of a rear camera, extracts a white line dividing a current traveling lane of a subject vehicle traveling on a freeway, recognizes the type, and extracts the traveling lane of the subject vehicle. Further, in the technology of the comparative example, at a branch portion, the current traveling lane of the subject vehicle is estimated based on whether the subject vehicle crosses the white line, a type of the crossed white line, and a branch type included in map data. Furthermore, in the comparative example, it is assumed that, unless the subject vehicle changes the lane, types of right and left white lines are not changed from previous types of white lines. When the white line types are not clear, a current right white line type or a current left white line type is estimated based on past white line type information stored as traveling history data.

SUMMARY

By a traveling lane estimation apparatus, a traveling lane estimation method, a control program, a computer-readable non-temporary storage medium, a front vehicle may be recognized based on a sensing result by a periphery monitoring sensor, a front vehicle traveling trajectory may be estimated based on a front vehicle position, map data including lane number information may be acquired; a subject vehicle position on a map may be identified, an inappropriate traveling trajectory for estimating the subject vehicle traveling lane may be determined; and the subject vehicle traveling lane may be estimated.

BRIEF DESCRIPTION OF THE DRAWINGS

The above and other features and advantages of the present disclosure will be more clearly understood from the following detailed description with reference to the accompanying drawings. In the accompanying drawings.

DETAILED DESCRIPTION

Figure 1:
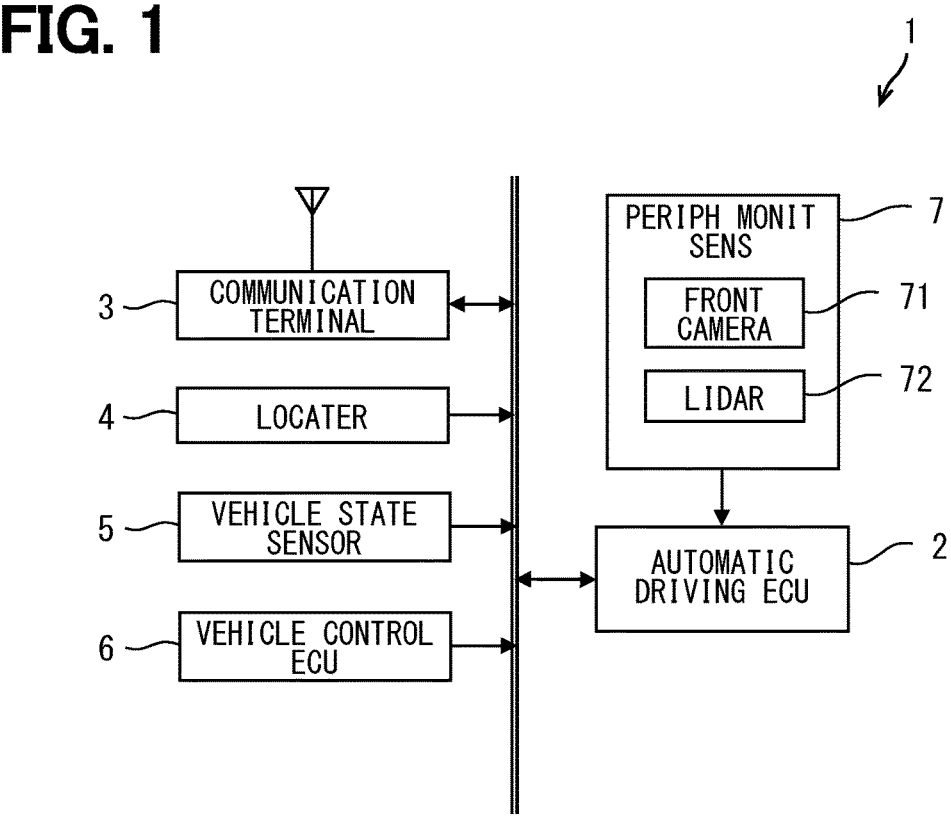
FIG. 1 is a diagram showing one example of a schematic configuration of a drive assist system.

In the comparative example, when the white line type is not clear, the current left white line type or the current right white line is estimated based on the past white line type information stored as the traveling history data. However, since the white line is not continuous in a section where the number of vehicle lanes increases or decreases such as a branch portion, it is difficult to estimate the current left white line type or the current right white line type based on the past white line type information. Accordingly, in the comparative example, when there is no white line or the white line type cannot be recognized, it may be difficult to accurately estimate the traveling lane of the subject vehicle.

One example of the present disclosure provides a traveling lane estimation apparatus, a traveling lane estimation method, a control program, a computer-readable non-temporary storage medium that are capable of more accurately estimating a traveling lane of a subject vehicle even in a section where it is difficult to recognize a traveling lane marking type based on an image recognition process of a camera image.

According to one example embodiment, the traveling lane estimation apparatus includes: a front vehicle recognition portion that recognizes a front vehicle in front of a subject vehicle based on a sensing result by a periphery monitoring sensor that is mounted on a vehicle and monitors a periphery of the subject vehicle; a trajectory estimation portion that estimates a front vehicle traveling trajectory based on a front vehicle position sequentially recognized by the front vehicle recognition portion; a map data acquisition portion that acquires map data including lane number information; a subject vehicle identification portion that identifies a subject vehicle position on a map based on the map data acquired by the map data acquisition portion; a traveling lane estimation portion that estimates a traveling lane of the subject vehicle based on the lane number information that is included in the map data acquired by the map data acquisition portion and corresponds to the subject vehicle position identified by the subject vehicle position identification portion and a lateral direction positional relationship of the subject vehicle position identified by the subject vehicle position identification portion with respect to the front vehicle traveling trajectory estimated by the traveling trajectory estimation portion; and a determination portion that determines an inappropriate traveling trajectory for estimating the subject vehicle traveling lane by the traveling lane estimation portion. The traveling lane estimation portion is estimates the subject vehicle traveling lane without using a traveling trajectory that is the front vehicle traveling trajectory estimated by the trajectory estimation portion and is determined to be inappropriate by the determination portion.

According to another example embodiment, a traveling lane estimation method includes: recognizing a front vehicle in front of a subject vehicle based on a sensing result by a periphery monitoring sensor that is mounted on a vehicle and monitors a periphery of the subject vehicle; estimating a front vehicle traveling trajectory based on a front vehicle position that is sequentially recognized; a subject vehicle identification portion that identifies a subject vehicle position on a map based on the map data including the lane number information acquired by the map data acquisition portion; determining an inappropriate traveling trajectory for estimating the subject vehicle traveling lane; and estimating the subject vehicle traveling lane based on the lane number information that is included in acquired map data and corresponds to an identified subject vehicle position and a lateral direction positional relationship of the identified subject vehicle position with respect to a traveling trajectory that is an estimated front vehicle traveling trajectory and is other than the inappropriate traveling trajectory for estimating the subject vehicle traveling lane.

Further, according to another example embodiment, a computer-readable non-temporary storage medium stores a computer program. The control program causes a computer to function as: a front vehicle recognition portion that recognize a front vehicle in front of a subject vehicle based on a sensing result by a periphery monitor sensor that monitors a periphery of the subject vehicle; a trajectory estimation portion that estimates a front vehicle traveling trajectory based on a front vehicle position sequentially recognized by the front vehicle recognition portion; a map data acquisition portion that acquires map data including lane number information; a subject vehicle identification portion that identifies a subject vehicle position on a map based on the map data acquired by the map data acquisition portion; a determination portion that determines an inappropriate traveling trajectory for estimating the subject vehicle traveling lane; and a traveling lane estimation portion that estimates a traveling lane of the subject vehicle based on the lane number information that is included in the map data acquired by the map data acquisition portion and corresponds to the subject vehicle position identified by the subject vehicle position identification portion and a lateral direction positional relationship of the subject vehicle position identified by the subject vehicle position identification portion with respect to a traveling trajectory that is the front vehicle traveling trajectory estimated by the traveling trajectory estimation portion and is other than the inappropriate traveling trajectory determined to be inappropriate by the determination portion.

By using the lane number information corresponding to the subject vehicle position and the lateral direction positional relationship of the subject vehicle position corresponding to the front vehicle traveling trajectory, it may be possible to identify whether there is a lane on the left or the right of the subject vehicle. When there are multiple lanes, it may be possible to identify which of lanes is closer to the subject vehicle. Thereby, it may be possible to estimate which of the multiple lanes is the traveling lane of the subject vehicle. Since the traveling trajectory of the front vehicle is used, even in the section where it is difficult to recognize the traveling lane marking type based on the image recognition process of the camera image, it may be possible to estimate the traveling lane of the subject vehicle. Further, since the traveling trajectory other than the traveling trajectory determined to be inappropriate for estimating the traveling lane of the subject vehicle is used, it may be possible to prevent the decrease in the estimation accuracy of the traveling lane of the subject vehicle due to the traveling trajectory determined to be inappropriate for estimating the traveling lane of the subject vehicle. As the result, even in the section where it is difficult to recognize the traveling lane marking type based on the image recognition process of the camera image, it may be possible to more accurately estimate the traveling lane of the subject vehicle.

Hereinafter, multiple embodiments will be described with reference to the drawings. For convenience of description, the same reference symbols are assigned to portions having the same functions as those illustrated in the drawings used in the description of embodiments, and a description of the same portion may be omitted. The description of other embodiments may be referred to with respect to these portions given the same reference symbols.

First Embodiment (Schematic Configuration of Driving Assist System)

Hereinafter, a first embodiment will be described with reference to the drawings. A driving assist system 1 shown in FIG. 1 is used for a vehicle such as an automobile, and includes an automatic driving ECU 2, a communication terminal 3, a locator 4, a vehicle state sensor 5, a vehicle control ECU 6, and a periphery monitoring sensor 7. The automatic driving ECU 2, the communication terminal 3, the locator 4, the vehicle state sensor 5, and the vehicle control ECU 6 are connected to, for example, an in-vehicle LAN. Hereinafter, a vehicle using the driving assist system 1 is referred to as a subject vehicle. In the drawings, the periphery monitoring sensor 7 may be also referred to as "PERIPH MONIT SENS".

The communication terminal 3 communicates with a server that distributes map data via a public communication network, and receives the map data distributed from this server. The map data is link data, node data, or the like. The link data includes various pieces of data such as a link ID identifying a link, a link length indicating a length of the link, a link azimuth, a link travel time, link shape information (hereinafter, link shape), node coordinates (latitude/longitude) of a start point and an end point of the link, and road attributes. As one example, the link shape may consist of a coordinate sequence representing coordinate positions of shape interpolation points representing a shape formed of both ends of the link and a position between the both ends. The road attributes include a road name, a road type, a road width, lane number information indicating the number of lanes, a speed regulation value, and the like. The node data includes a various pieces of data such as a node ID in which a unique number is assigned to each node on a map, node coordinates, a node name, a node type, a connection link ID in which a link ID of a link connected to the node is described, and the like. The lane number information may be configured, for example, for each link azimuth of an outbound lane and an inbound lane. That is, the lane number information may be information indicating the number of lanes on each side.

The link data may be configured for each road section. However, in the present embodiment, an example in which the link data is configured for each lane and subdivided as compared with the link data for each road section will be described. That is, even in the same road section, when there are multiple lanes (traveling lanes), the link data exists for each of the multiple lanes. When the link data is configured for each lane, the lane number information may include a lane number indicating which lane is among multiple lanes, or the like.

The locator 4 includes a GNSS (Global Navigation Satellite System) receiver and an inertial sensor. The GNSS receiver receives positioning signals from multiple positioning satellites. The inertial sensor includes a gyro sensor and an acceleration sensor, for example. The locator 4 combines the positioning signals received by the GNSS receiver with the measurement results of the inertial sensors to sequentially detect the vehicle position (hereinafter, subject vehicle position) of the subject vehicle on which the locator 4 is mounted. The subject vehicle position may be represented by, for example, coordinates of latitude and longitude. The subject vehicle position may be measured using a travel distance obtained from signals sequentially output from a vehicle speed sensor mounted on the subject vehicle.

The vehicle state sensor 5 is a sensor group for detecting each state of the subject vehicle, and includes a behavior sensor that detects a physical state amount related to a subject vehicle behavior and an operation state sensor for detecting a subject vehicle operation state. The behavior sensor includes a vehicle sensor that detects a vehicle speed of the subject vehicle, a steering sensor that detects a steering angle of the subject vehicle, and a yaw rate sensor that detects a yaw rate of the subject vehicle, or the like. As the sensor that detects the yaw rate, the inertial sensor of the locator 4 may be used. The operation state sensor includes, an accelerator position sensor that detects an opening degree of an accelerator pedal of the subject vehicle, a brake pedaling force sensor that detects the pedaling amount of a brake pedal of the subject vehicle, or the like. The vehicle state sensor 5 outputs detected sensing information to the in-vehicle LAN. Note that the sensing information detected by the vehicle state sensor 5 may be output to the in-vehicle LAN via the ECU mounted on the subject vehicle.

The vehicle control ECU 6 is an electronic control device that performs acceleration and deceleration control and/or steering control of the subject vehicle. The vehicle control ECU 6 includes a steering ECU that performs steering control, a power unit control ECU and a brake ECU that perform acceleration/deceleration control, and the like. The vehicle control ECU 6 acquires detection signals output from respective sensors such as the accelerator position sensor, the brake pedaling force sensor, the steering angle sensor, the vehicle speed sensor, and the like mounted on the subject vehicle, and outputs a control signal to an electronic control throttle, a brake actuator, an EPS (Electronic Power Steering) motor, and the like. Further, the vehicle control ECU 6 is capable of outputting the sensing information of each of the above sensors to the in-vehicle LAN.

The periphery monitoring sensor 7 is an autonomous sensor that monitors the peripheral environment of the subject vehicle. As one example, the periphery monitoring sensor 7 is used for recognizing moving dynamic targets such as pedestrians, animals other than human, and vehicles other than the subject vehicle and stationary static targets such as guardrails, curbs, and trees. In addition, the periphery monitoring sensor 7 is used for recognizing road markings such traffic lane markings in peripheral of the subject vehicle. For example, the periphery monitoring sensor 7 includes scanning wave sensors such as a periphery monitoring camera that captures a predetermined range in peripheral of the subject vehicle, a milliwave radar that transmits scanning waves to the predetermined range in peripheral of the subject vehicle, a sensor, and a LIDAR (Light Detection and Ranging/Laser Imaging Detection and Ranging).

The periphery monitoring camera sequentially outputs the captured images to be sequentially captured as sensing information to the in-vehicle LAN. The scanning wave sensor sequentially outputs to the in-vehicle LAN as sensing information, the scanning result based on the received signal obtained when the reflected wave reflected by the object is received. More specifically, the scanning wave sensor measures a distance from the scanning wave sensor to a target object based on a time taken from transmitting the scanning wave to receiving a reflected wave reflected by the target object. By using the scanning wave, the scanning wave sensor measures an orientation with respect to the scanning wave sensor based on a transmission angle of the scanning wave when the reflected wave is received.

In the present embodiment, hereinafter, an example of using, as the periphery monitoring sensor 7, a front camera 71 of which capture range is a predetermined range in front of the subject vehicle and a LIDAR 72 of which measurement range is a predetermined range in front of the subject vehicle, will be described.

The automatic driving ECU 2 is mainly configured by a processor, a volatile memory, a non-transitory tangible storage medium such as a nonvolatile memory, an I/O, and a microcomputer including buses for connecting those components, and executes various processes related to the automatic driving by executing control programs stored in the non-volatile memory. The various processes related to the automatic driving include a process (hereinafter, traveling lane estimation process) of estimating the traveling lane of the subject vehicle. The memory mentioned in the above is a non-transitory tangible storage medium that non-temporarily stores computer-readable program and data. The non-transitory tangible storage medium is embodied by a semiconductor memory or a magnetic disk. The processes performed by the automatic driving ECU 2 will be described later in more detail.

<Schematic Configuration of Automatic Driving ECU>

Figure 2:
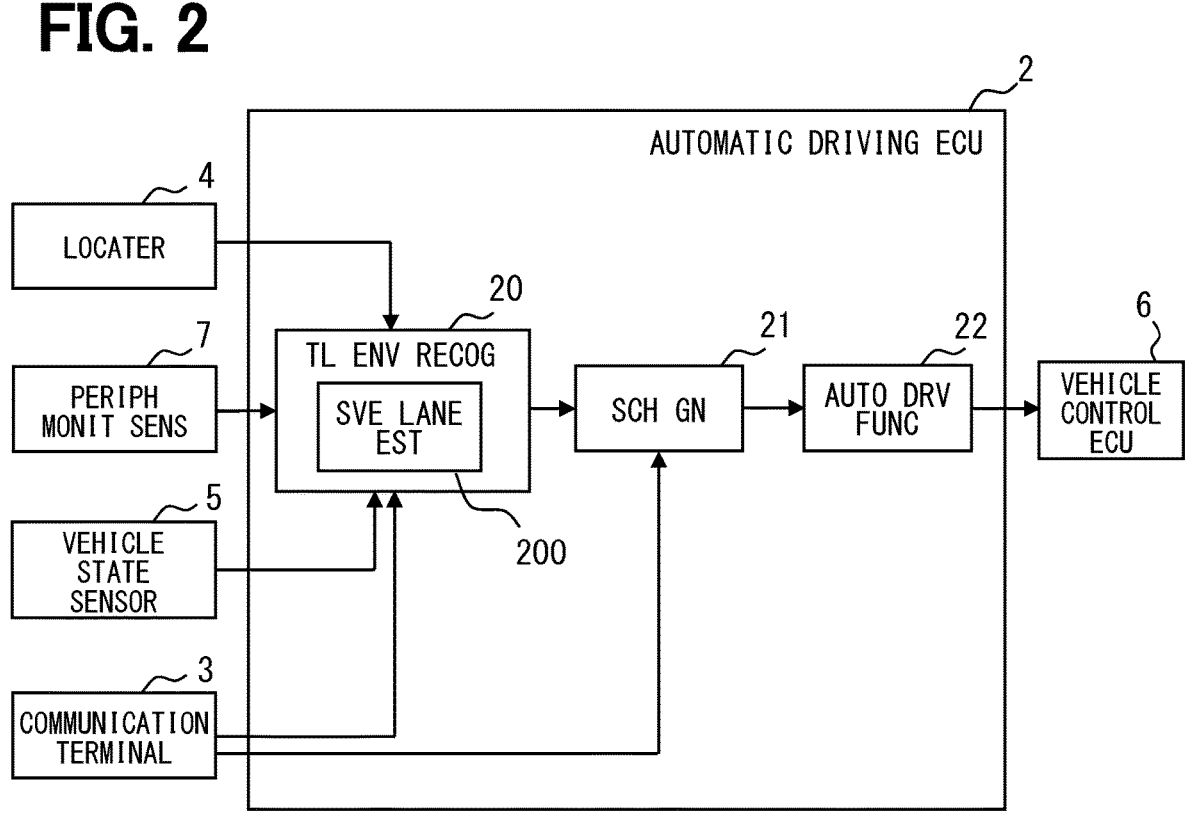
FIG. 2 is a diagram showing one example of a schematic configuration of an automatic driving ECU.

A schematic configuration of the automatic driving ECU 2 will be described with reference to FIG. 2. As shown in FIG. 2, the automatic driving ECU 2 includes a traveling environment recognition portion 20, a schedule generation portion 21, and an automatic driving function portion 22 as functional blocks. Note that a part or all of the functions to be executed by the automatic driving ECU 2 may be configured as hardware circuitry by one or multiple ICs or the like. Further, some or all of the functions executed by the automatic driving ECU 2 may be implemented by a combination of hardware manner and software manner which adopts a processor to execute the functions. In the drawings, the traveling environment recognition portion 20 may be also referred to as "TL ENV RECOG", the schedule generation portion 21 may be also referred to as "SCH GN", the automatic driving function portion 22 may be also referred to as "AUTO DRV FUNC".

The traveling environment recognition portion 20 recognizes a traveling environment of the subject vehicle based on the map data acquired from the communication terminal 3, the subject vehicle position acquired from the locator 4, the sensing information acquired from the periphery monitoring sensor 7, the sensing information acquired from the vehicle state sensor 5, or the like. AS one example, with use of these information, the traveling environment recognition portion 20 recognizes a position of an object in peripheral of the subject vehicle, a shape, and a movement state, and generates a virtual space in which the actual traveling environment is reproduced. When recognizing the traveling environment of the subject vehicle, a subject vehicle lane estimation portion 200 in the traveling environment recognition portion 20 executes a traveling lane estimation process of estimating the traveling lane in which the subject vehicle is traveling. This subject vehicle lane estimation portion 200 corresponds to a traveling lane estimation apparatus. Execution of the control program by a processor for the traveling lane estimation process corresponds to execution of a traveling lane estimation method corresponding to the control program. In the drawings, the subject vehicle lane estimation portion 200 may be also referred to as "SVE LANE EST".

In a case where the traveling lane markings can be recognized based on the sensing information acquired form the periphery monitoring sensor 7, the subject vehicle lane estimation portion 200 estimates the traveling lane of the subject vehicle based on the number of traveling lane markings to be recognized or the subject vehicle positions with respect to these traveling lane markings. The case where the traveling lane markings can be recognized based on the sensing information acquired form the periphery monitoring sensor 7 includes a case where the traveling lane markings or, the traveling lane markings and the types can be recognized by executing an image recognition process on the capture image of the front camera 71. A process in a case where the traveling lane markings cannot be recognized based on the sensing information acquired form the periphery monitoring sensor 7 will be described later.

The schedule generation portion 21 uses the traveling environment recognized by the traveling environment recognition portion 20, and generates the traveling schedule for causing the subject vehicle to travel with the automatic driving. For example, in a medium- and long-term traveling schedule, the schedule generation portion 21 executes a route search process and generates a recommendation route for causing the vehicle to go from the subject vehicle position to a destination. In a short-term traveling schedule for performing travel along the medium- and long-term traveling schedule, steering for changing the lane, acceleration and deceleration for adjusting the speed, execution of steering, braking, and the like for avoiding obstacles are determined.

The automatic driving function portion 22 causes the vehicle control ECU 6 to automatically accelerate, brake, or steer the subject vehicle according to the traveling schedule output from the schedule generation portion 21, thereby replacing the driving operation of the driver. The replacement of the driving operation is referred to as automatic driving.

<Schematic Configuration of Subject Vehicle Lane Estimation Portion>

Figure 3:
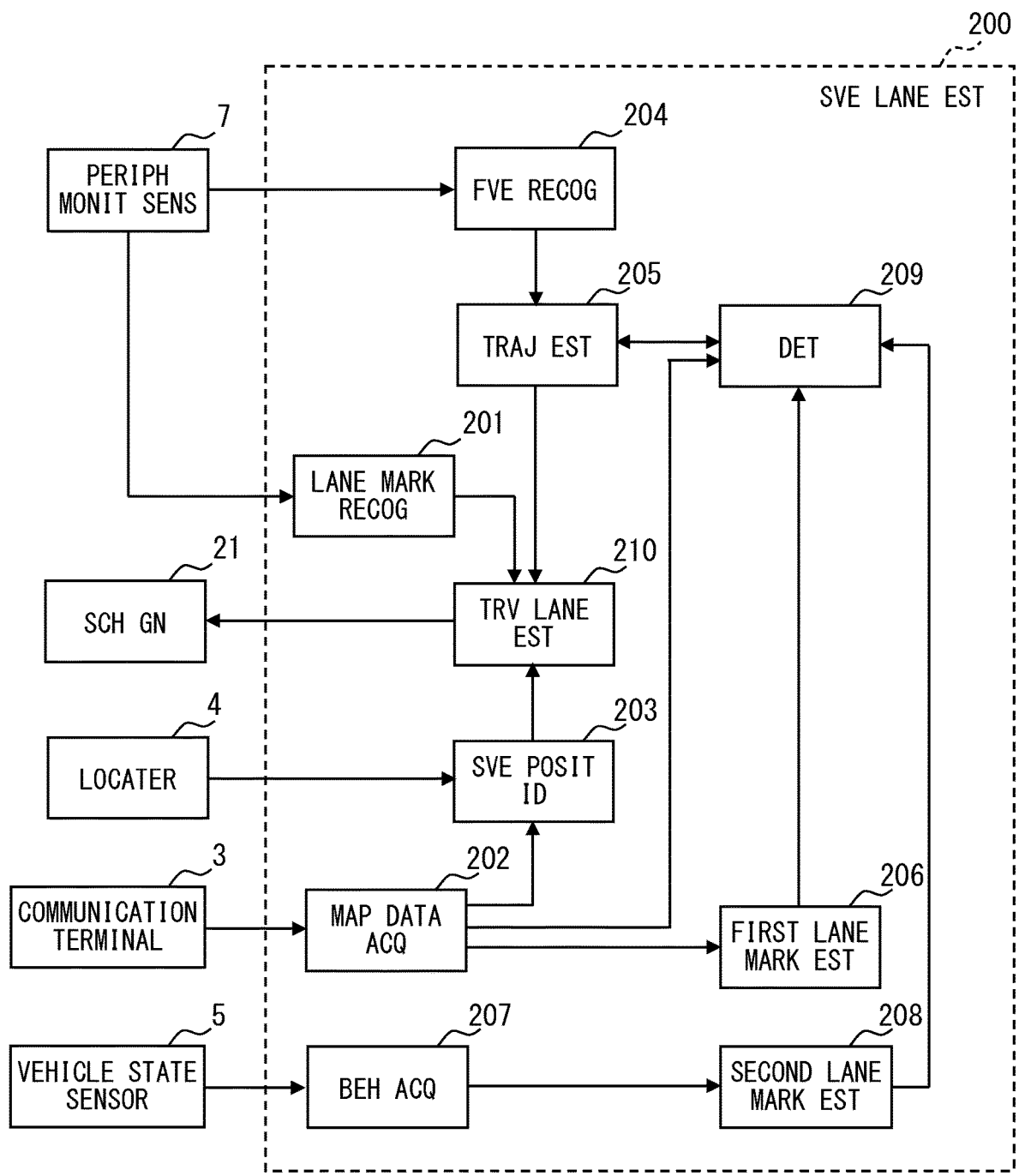
FIG. 3 is a diagram showing one example of a schematic configuration of a subject vehicle lane estimation portion.

Here, a schematic configuration of the subject vehicle lane estimation portion 200 will be described with reference to FIG. 3. As shown in FIG. 3, the subject vehicle lane estimation portion 200 includes a lane marking recognition portion 201, a map data acquisition portion 202, a subject vehicle position identification portion 203, a front vehicle recognition portion 204, a trajectory estimation portion 205, a first lane marking estimation portion 206, a behavior acquisition portion 207, a second lane marking estimation portion 208, a determination portion 209, and a traveling lane estimation portion 210, as functional blocks. In the drawings, the lane marking recognition portion 201 may be also referred to as "LANE MARK RECOG", the map data acquisition portion 202 may be also referred to as "MAP DATA ACQ", the subject vehicle position identification portion 203 may be also referred to as "SVE POSIT ID", the front vehicle recognition portion 204 may be also referred to as "FVE RECOG", the trajectory estimation portion 205 may be also referred to as "TRAJ EST", the first lane marking estimation portion 206 may be also referred to as "FIRST LANE MARK EST", the behavior acquisition portion 207 may be also referred to as "BEH ACQ", the second lane marking estimation portion 208 may be also referred to as "SECOND LANE MARK EST", the determination portion 209 may be also referred to as "DET", and the traveling lane estimation portion 210 may be also referred to as "TRV LANE EST".

The lane marking recognition portion 201 recognizes the traveling lane marking or, traveling lane marking and the type by executing edge detection on the capture image sequentially output from the front camera 71 and executing the image recognition process such as pattern recognition. The lane marking recognition portion 201 may recognize the traveling lane marking or, the traveling lane marking and the type by the image recognition process using a machine learning.

The map data acquisition portion 202 acquires the map data received by the communication terminal 3. In the present embodiment, the communication terminal 3 receives the map data from the server outside the subject vehicle. However, it is not necessarily limited to this. For example, the map data may be stored in a non-volatile memory mounted on the subject vehicle, and the map data acquisition portion 202 may acquire the map data from this non-volatile memory.

The subject vehicle position identification portion 203 identifies the subject vehicle position on the map based on the subject vehicle portion acquired from the locator 4 and the map data acquired by the map data acquisition portion 202. As one example, the subject vehicle position on the road is matched by a map matching process, and thereby the subject vehicle position on the map is identified. The subject vehicle position identification portion 203 may identify a link direction based on an advancing direction identified from the subject vehicle position sequentially acquired from the locator 4, and match the subject vehicle position on the road. In a case of a road having multiple lanes on each side, for example, the subject vehicle position identification portion 203 may temporarily identify the traveling lane based on a determination of a link closest to the subject vehicle position acquired from the locator 4 or the like, and may match the traveling lane on the road.

The front vehicle recognition portion 204 recognizes the vehicle in front of the subject vehicle from the sensing result by the periphery monitoring sensor 7. The front vehicle recognition portion 204 executes the image recognition process such as the edge detection or the pattern recognition on the capture image sequentially output from the front camera 71, and recognizes the vehicle in front of the subject vehicle. The front vehicle recognition portion 204 may also recognize a front vehicle position with respect to the subject vehicle based on the camera parameter of the front camera 71 and the front vehicle position in the capture image. The front vehicle with respect to the subject vehicle is a vehicle in front of the subject vehicle, and is not limited to a vehicle that travels in the same lane where the subject vehicle travels. The front vehicle recognition portion 204 may recognize the front vehicle of the subject vehicle based on the capture images sequentially output from the front camera 71 by an image recognition process using machine learning.

The front vehicle recognition portion 204 may recognize the front vehicle with respect to the subject vehicle based on scanning results sequentially output from the LIDAR 72. As one example, the front vehicle with respect to the subject vehicle may be recognized based on the object size, direction, object movement state, or the like that is detected based on the scanning results sequentially output from the LIDAR 72. The front vehicle recognition portion 204 may recognize the front vehicle position with respect to the subject vehicle position based on a distance to a target and a direction to the target among the scanning results sequentially output from the LIDAR 72.

The front vehicle recognition portion 204 may recognize the front vehicle with respect to the subject vehicle and may recognize the front vehicle position with respect to the subject vehicle based on both of the sensing result from the periphery monitoring sensor 7 and the scanning results sequentially output from the LIDAR 72. The front vehicle recognition portion 204 may recognize the front vehicle with result to the subject vehicle and may recognize the front vehicle position with respect to the subject vehicle based on a sensing result from a scanning wave sensor such as a millimeter wave radar instead of the LIDAR 72.

The trajectory estimation portion 205 estimates a traveling trajectory of the front vehicle based on the front vehicle positions sequentially recognized by the front vehicle recognition portion 204. As one example, regression analysis for curve fitting may be performed based on a point group of the position coordinates of the front vehicle sequentially recognized by the front vehicle recognition portion 204, thereby a regression curve may be obtained, and the regression curve may be estimated as the traveling trajectory. Alternatively, a road shape model may be estimated by the Kalman filter based on the position coordinates of the front vehicle sequentially recognized by the front vehicle recognition portion 204, and thereby the traveling trajectory of the front vehicle may be estimated. As the position coordinates of the front vehicle, for example, a coordinate obtained by converting the front vehicle position with respect to the subject vehicle into coordinates of the longitude and the latitude based on the subject vehicle position may be used.

The first lane marking estimation portion 206 estimates a traveling lane marking position based on the link shape in the map data acquired by the map data acquisition portion 202. As one example, based on the link shape of the link corresponding to the subject vehicle position, which is identified by the subject vehicle position identification portion 203, on the road and the road width, the coordinate sequence of the link shape is set to the center line, and right and left positions separated by half width of the road may be estimated as the traveling lane marking positions. In a case of a section having multiple lanes, the traveling lane marking position for each lane may be estimated by executing the similar process for each lane. The link is not limited to the link corresponding to the subject vehicle. The traveling lane marking position may be estimated by executing the similar process with use of a link in front of the link corresponding to the subject vehicle position.

The behavior acquisition portion 207 acquires a sensing result by the behavior sensor of the vehicle state sensor 5. The behavior acquisition portion 207 acquires a sensing result of the vehicle speed of the subject vehicle form the vehicle speed sensor, and acquires a sensing result of the subject vehicle from the yaw rate sensor. The behavior acquisition portion 207 may acquire a sensing result of the steering angle of the subject vehicle from the steering sensor instead of the yaw rate angle.

The second lane marking estimation portion 208 estimates the traveling lane marking position of the subject vehicle traveling lane based on the behavior sensor sensing result sequentially acquired by the behavior acquisition portion 207. As one example, a feature traveling trajectory of the subject vehicle is estimated with use of the Kalman filter based on the subject vehicle speed and the yaw rate that are sequentially acquired by the behavior sensor. Then, it is assumed that the subject vehicle travels in the center of the traveling lane. The coordinate sequence of this future traveling trajectory is set to the center line, and right and left positions separated by a predetermined distance may be estimated as the positions of the traveling lane marking. The predetermined distance described here may be set to a distance that is half the width of a general road. By using the road width in the map data acquired by the map data acquisition portion 202, the coordinate sequence of the feature traveling trajectory is set to the center line, and right and left positions separated by the half width of the road may be estimated as the traveling lane marking positions.

Figure 4:
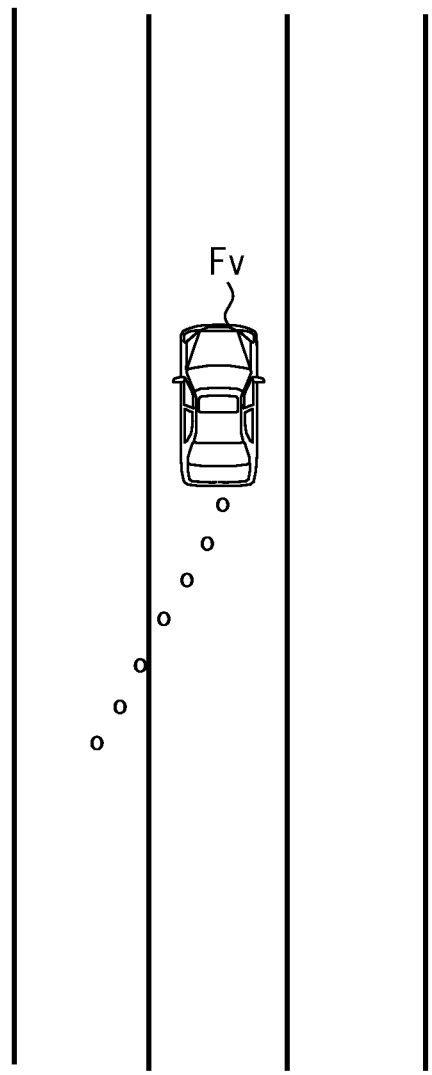
FIG. 4 is a view illustrating one example of a traveling trajectory when a front vehicle changes a lane.
Figure 5:
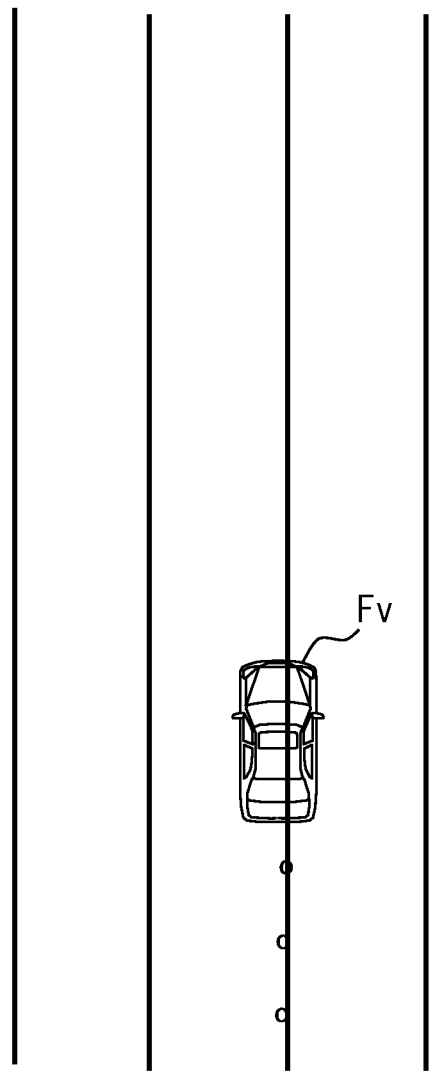
FIG. 5 is a view illustrating one example of a traveling trajectory during continuous straddle traveling of the front vehicle.
Figure 6:
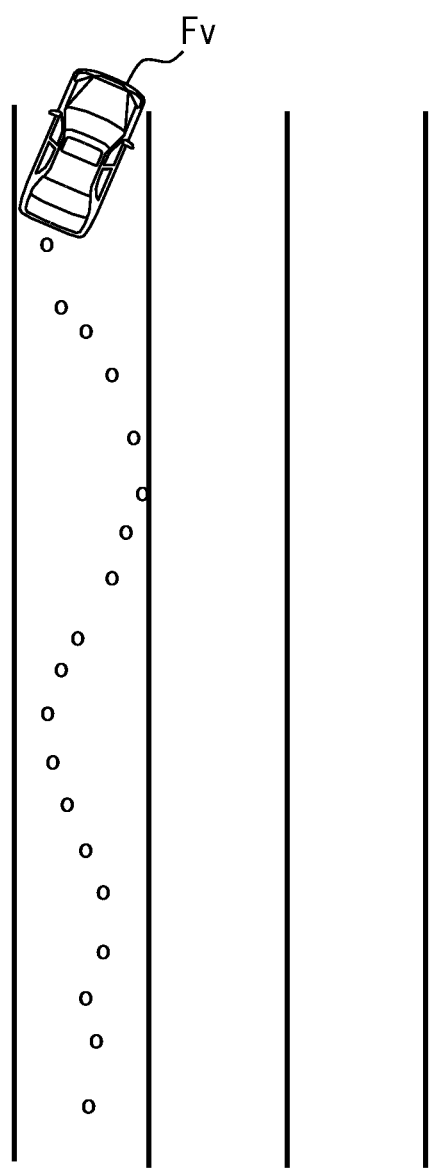
FIG. 6 is a view illustrating one example of a traveling trajectory during zigzag traveling of the front vehicle.

The determination portion 209 determines a traveling trajectory that is not appropriate for estimating the subject vehicle traveling lane by the traveling lane estimation portion 210 among the traveling trajectories of the front vehicle estimated by the trajectory estimation portion 205. The inappropriate traveling trajectory for estimating the traveling lane of the subject vehicle may be set to a traveling trajectory while the vehicle travels in the same lane and the different lane such as the traveling trajectory when the lane is changed (see FIG. 4) and the traveling trajectory while the vehicle continuously straddles the traveling lane marking (hereinafter, during continuous straddle traveling) (see FIG. 5). A traveling trajectory while the vehicle travels in the same lane and zigzags from the center of the lane (hereinafter, during zigzag traveling) (see FIG. 6) may be set to the traveling trajectory that is not appropriate for estimating the traveling lane of the subject vehicle. The range of the traveling trajectory determined by the determination portion 209 can be arbitrarily set. FIGS. 4 to 6 show an example in a case of three lanes on each side. The Fv indicates the front vehicle, the white circles indicate coordinate sequences of the traveling trajectory, and the solid lines indicate the traveling lane markings.

The determination portion 209 may determine the traveling trajectory of the front vehicle estimated by the trajectory estimation portion 205 as the traveling trajectory inappropriate for estimating the traveling lane of the subject vehicle when the variation of the point group of the front vehicle position coordinates used for estimating the traveling trajectory is equal to or higher than the threshold value. As one example, in the regression curve of the traveling trajectory, a fit error of the point group of the position coordinates of the front vehicle in the range of the traveling trajectory to be determined may be used as the variation. An average of distance between the regression curve of the traveling trajectory and the point group of the position coordinates of the front vehicle in the range of the traveling trajectory to be determined may be used as the variation. The threshold described here may be any threshold for determining the zigzag traveling, and can be arbitrarily set.

According to this, it may be possible to determine the traveling trajectory during the zigzag traveling as the traveling trajectory inappropriate for estimating the traveling lane of the subject vehicle.

The determination portion 209 may determine that the traveling trajectory is inappropriate for estimating the traveling lane of the subject vehicle when a deviation degree between the front vehicle traveling trajectory estimated by the trajectory estimation portion 205 and the link shape of the section including the estimated traveling trajectory (hereinafter, target section) in the map data acquired by the map data acquisition portion 202 is equal to or higher than the threshold.

As one example, the determination portion 209 may determine that the traveling trajectory is inappropriate for estimating the traveling lane of the subject vehicle when a deviation in a lateral direction and a deviation in a yaw direction between the front vehicle traveling trajectory estimated by the trajectory estimation portion 205 and the link shape in the map data acquired by the map data acquisition portion 202 is equal to or higher than the threshold.

As the link shape here, a link shape of a link whose position is closest to the section where the traveling trajectory is estimated may be used. The lateral direction described here can be also referred to as a road width direction. The threshold for the deviation in the lateral direction is a threshold for discerning in-lane change traveling and lane change, and can be arbitrarily set. For example, the threshold may be set to a value of about the road width for one lane, for example. The deviation in the yaw direction described here can be referred to as an inclination of the traveling trajectory with respect to the link shape. The inclination of the traveling trajectory with respect to the link shape may be obtained by, for example, linearly approximating the point group of each of the link shape and the traveling trajectory with use of the least squares method. The threshold value for the deviation in the yaw direction is a threshold for discerning the traveling that is along the link shape and a traveling that is not along the link shape, and can be arbitrarily set. According to this, it may be possible to determine the traveling trajectory during the lane change as the traveling trajectory inappropriate for estimating the traveling lane of the subject vehicle.

In the present embodiment, the determination portion 209 will be described below with an example of a case where the zigzag traveling and the lane change are discerned. The determination portion 209 may determine the traveling trajectory inappropriate for estimating the traveling lane of the subject vehicle without discerning the zigzag traveling and the lane change.

For example, the determination portion 209 may determine that the traveling trajectory is inappropriate for estimating the traveling lane of the subject vehicle when a deviation of an angle in the yaw direction between the front vehicle traveling trajectory estimated by the trajectory estimation portion 205 and the link shape of the target section in the map data acquired by the map data acquisition portion 202 is equal to or higher than the threshold. In addition, the determination portion 209 may determine that the traveling trajectory is inappropriate for estimating the traveling lane of the subject vehicle when a coincidence degree between the front vehicle traveling trajectory estimated by the trajectory estimation portion 205 and the link shape of the target section in the map data acquired by the map data acquisition portion 202 is less than a prescribed ratio (that is, the deviation degree is equal to or higher than the threshold value). The prescribed ratio described here is a value for discerning the traveling that is along the link shape and a traveling that is not along the link shape, and can be arbitrarily set. According to these, it may be possible to determine that the traveling trajectory is not appropriate for estimating the traveling lane of the subject vehicle without discerning the traveling trajectory during the zigzag traveling and the traveling trajectory during the lane change.

The determination portion 209 determines that the traveling trajectory is not appropriate for estimating the traveling lane of the subject vehicle when a distance causing a proximity degree between the front vehicle traveling trajectory estimated by the trajectory estimation portion 205 and the position of the traveling lane marking estimated by the first lane marking estimation portion 206 to be equal to or higher than the threshold is equal to or higher than the prescribed distance. The threshold value for the proximity degree is a value for determining whether the front vehicle crosses the traveling lane marking, can be arbitrarily set, and, for example, may be set to half the width of the general vehicle. The prescribed distance described here is a value for excluding temporary traveling such that the vehicle straddles (crosses) the traveling lane marking during the lane change, and can be arbitrarily set. According to this, it may be possible to determine the traveling trajectory during the continuous straddle traveling as the traveling trajectory inappropriate for estimating the traveling lane of the subject vehicle.

The determination portion 209 may determine that the traveling trajectory is not appropriate for estimating the traveling lane of the subject vehicle when a distance causing a proximity degree between the front vehicle traveling trajectory estimated by the trajectory estimation portion 205 and the position of the traveling lane marking estimated by the second lane marking estimation portion 208 to be equal to or higher than the threshold is equal to or higher than the prescribed distance. The threshold for the proximity degree and the prescribed distance may be set in the similar manner described above. According to this, it may be possible to determine the traveling trajectory during the continuous straddle traveling as the traveling trajectory inappropriate for estimating the traveling lane of the subject vehicle.

The subject vehicle lane estimation portion 200 may include only one of the first lane marking estimation portion 206 or the second lane marking estimation portion 208, and the determination portion 209 may determine the traveling trajectory inappropriate for estimating the traveling lane of the subject vehicle based on the position of the traveling lane marking estimated by the included one.

The traveling lane estimation portion 210 estimates the traveling lane of the subject vehicle based on the traveling lane marking estimated by the lane marking recognition portion 201 when the lane marking recognition portion 201 can recognize the traveling lane marking. As one example, when the traveling lane marking corresponding to the number of lanes indicated by the lane number information has been recognized, the traveling lane of the subject vehicle may be estimated based on the positional relationship of the subject vehicle with respect to the traveling lane markings. Even when the traveling lane markings for the number of lanes indicated by the lane number information has not been recognized, the traveling lane marking of the lane among the lanes indicated by the lane number information is estimated based on the traveling lane marking type, and the traveling lane of the subject vehicle may be estimated based on the positional relationship of the subject vehicle with respect to the traveling lane marking.

On the other hand, when the lane marking recognition portion 201 has not recognized the traveling lane marking, the traveling lane estimation portion 210 estimates the traveling lane of the subject vehicle based on the traveling lane marking that had been recognized until then, the lane number information (hereinafter, target lane number information) corresponding to the subject vehicle position identified by the subject vehicle position identification portion 203 in the map data acquired by the map data acquisition portion 202, and a lateral direction positional relationship of the subject vehicle position identified by the subject vehicle position identification portion 203 with respect to the front vehicle traveling trajectory estimated by the trajectory estimation portion 205. Hereinafter, the lateral direction positional relationship of the subject vehicle position identified by the subject vehicle position identification portion 203 with respect to the front vehicle traveling trajectory estimated by the trajectory estimation portion 205 may be also referred to as a lateral direction position relationship. When the target lane number information indicates the multiple lanes on each side, the traveling lane estimation portion 210 may execute this process. When the target lane number information indicates one lane on each side, the traveling lane estimation portion 210 may estimate the one lane as the traveling lane of the subject vehicle. Hereinafter, a process when the target lane number information indicates multiple lanes on each side will be described.

When it is assumed that the front vehicle continues to travel in the same lane, the traveling trajectory of the front vehicle estimated by the trajectory estimation portion 205 is within the range of the lane where the front vehicle travels. Accordingly, by using the target lane number information and the lateral direction positional relationship, it may be possible to more accurately estimate the traveling lane of the subject vehicle.

Figure 7:
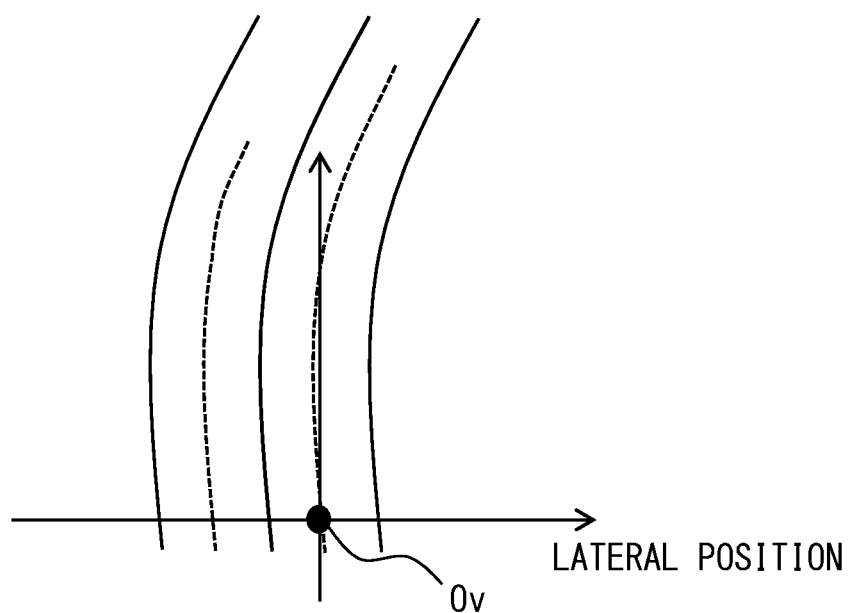
FIG. 7 is a view illustrating one example of estimating the traveling lane of the subject vehicle based on traveling lane number information and a lateral direction positional relationship.

As one example, as shown in FIG. 7, when the traveling trajectories of the front vehicle are estimated as traveling trajectories of different lanes from each other and the number of traveling trajectories is same as the number of lanes of the target lane number information, the traveling trajectories can be associated with the multiple lanes indicated by the target lane number information. Accordingly, a lane associated with a traveling trajectory whose lateral direction position is closest to the subject vehicle position among the traveling trajectories is estimated as the traveling lane of the subject vehicle. A dotted line in FIG. 7 indicates the traveling trajectory of the front vehicle, and Ov indicates the subject vehicle position. As a method of estimating the traveling trajectory of the different vehicle lane, for example, a method of estimating the traveling trajectory of the different lane when lateral positions of the traveling trajectories are equal to or higher than a discerning distance may be used. The discerning distance described here is a distance for discerning the traveling trajectory in the same lane and the traveling trajectory in the different lane, and can be arbitrarily set. For example, the distance may be less than a road width, and also equal to or larger than half the road width.

Even when the number of traveling trajectories that are the traveling trajectories of the front vehicle and are different from each other is less than the number of lanes of the target lane number information, the traveling lane of the subject vehicle can be estimated as bellow.

For example, even in a case where the number of lanes in the target lane number information is three and the number of traveling trajectories estimated as traveling trajectories of the different lanes is two, when the lateral positions of the two traveling trajectories are separated by a degree causing the lateral positions to be estimated to sandwich one lane, the traveling trajectories can be associated with each of the outer lanes positions that are right and left lanes among the three lanes on each side. In this case, when, among the traveling trajectories, the traveling trajectory of which subject vehicle position and lateral direction position are less than the discerning distance exists, the lane associated with the traveling trajectory is estimated as the traveling lane of the subject vehicle. On the other hand, when, among the traveling trajectories, only the traveling trajectory of which subject vehicle position and lateral direction position are equal to or more than the discerning distance exists, the central lane of the three lanes on each side is estimated as the traveling lane of the subject vehicle.

Further, in a case where the number of lanes in the target lane number information is three and the number of traveling trajectories estimated as traveling trajectories of the different lanes is two, even when the lateral positions of the two traveling trajectories are not separated by the degree causing the lateral positions to be estimated to sandwich one lane, the traveling lane of the subject vehicle can be estimated as bellow. For example, when only the traveling trajectory of which subject vehicle position and lateral direction position are equal to or more than the discerning distance exists, the right outer lane or the left outer lane among the three lanes on each side is identified based on whether the subject vehicle position is located on the right or left of the traveling trajectories. Accordingly, when the subject vehicle position is located on the left of the traveling trajectories, the left outer lane among the three lanes on each side is estimated as the traveling lane of the subject vehicle. When the subject vehicle position is located on the right of the traveling trajectories, the right outer lane among the three lanes on each side is estimated as the traveling lane of the subject vehicle. Even in a case of multiple lanes other than the three lanes on each side, the traveling lane of the subject vehicle can be estimated by the similar method.

On the other hand, when the traveling lane estimation portion 210 cannot estimate the traveling lane of the subject vehicle based on the target lane number information and the lateral direction positional relationship, the traveling lane estimation portion 210 may estimate the traveling lane of the subject vehicle based on the traveling lane marking that had been recognized until then. As one example, it is assumed that the traveling lane marking that had been recognized until then continues. Based on a positional relationship between the traveling lane marking and the subject vehicle position, the traveling lane of the subject vehicle may be estimated.

The traveling lane estimation portion 210 estimates the traveling lane of the subject vehicle without using the traveling trajectory determined to be inappropriate by the determination portion 209 among the traveling trajectories of the front vehicle estimated by the trajectory estimation portion 205. In other words, the traveling lane estimation portion 210 estimates the traveling lane of the subject vehicle by using the appropriate traveling trajectory among the traveling trajectories of the front vehicle estimated by the trajectory estimation portion 205. This is because the traveling trajectory during the lane change, the traveling trajectory during the continuous straddle traveling, and the traveling trajectory during the zigzag traveling are difficult to be associated with one lane among multiple lanes indicated by the target lane number information. Therefore, when the traveling trajectories are used for association with the lane, erroneous estimation of the traveling lane of the subject vehicle easily occurs.

<Traveling Lane Estimation Process by Subject Vehicle Lane Estimation Portion>

Here, with reference to a flowchart of FIG. 8, one example of a flow of a traveling lane estimation process by the subject vehicle lane estimation portion 200 when the lane marking recognition portion 201 cannot recognize the traveling lane marking will be described. The process shown in FIG. 8 may be configured to start in response to a switch for starting an internal combustion engine or a motor generator of the subject vehicle being turned on. The switch for starting the vehicle is also referred to as a power switch. In addition, when the process is configured to switch the setting between manual driving and automatic driving of the subject vehicle, a setting of performing the automatic driving of the subject vehicle may be added to the condition.

First, in S1, the front vehicle recognition portion 204 recognizes the front vehicle of the subject vehicle and the position of the front vehicle with respect to the subject vehicle based on the sensing result by the periphery monitoring sensor 7. In S2, the trajectory estimation portion 205 estimates a traveling trajectory of the front vehicle based on the front vehicle positions sequentially recognized by the front vehicle recognition portion 204.

In S3, the determination portion 209 executes the zigzag determination process, and the process shifts to S4. Here, with reference to a flowchart of FIG. 9, one example of the zigzag determination process by the determination portion 209 will be described.

First, in S31, the determination portion 209 calculates variation of the point group of the front vehicle position coordinates used for estimating the traveling trajectory estimated in S2. As one example, in the regression curve of the traveling trajectory estimated in S2, the fit error of the point group of the position coordinates of the front vehicle in the range of the traveling trajectory or the average of distances may be calculated as the variation.

In S32, when the variation calculated in S31 is equal to or higher than the threshold (YES in S32), the process shifts to S33. In S33, the traveling trajectory estimated in S2 is determined to be not used for estimating the traveling lane of the subject vehicle by the traveling lane estimation portion 210, and the process shifts to S4. In this case, for example, a use permission flag indicating that traveling trajectory can be used for estimating the traveling lane of the subject vehicle by the traveling lane estimation portion 210 may be turned off. The use permission flag is set to an on-state as a default state.

On the other hand, when the variation calculated in S31 is less than the threshold value (NO in S32), the traveling trajectory estimated in S2 is not determined to be not used for estimating the traveling lane of the subject vehicle by the traveling lane estimation portion 210, and the process shifts to S4. Here, when the use permission flag is the on-state, the use permission flag is maintained. On the other hand, when the process of the flowchart in FIG. 8 is repeated, thereby the process of the flowchart in FIG. 9 is also repeated, and the use permission flag has been already changed from the on-state to an off-state, an availability flag is turned on.

Thereby, it can be determined that the traveling trajectory that is not used for estimating the traveling lane of the subject vehicle by the traveling lane estimation portion 210 is the traveling trajectory in the section where the variation calculated in S31 is equal to or more than the threshold. The traveling trajectory estimation performed from the time of turning off the availability flag to the time of turning on the availability flag may be reset when the availability flag is switched from the off-state to the on-state.

Returning to FIG. 8, in S4, the determination portion 209 executes a lane change determination process, and the process shifts to S5. Here, with reference to a flowchart of FIG. 10, one example of the lane change determination process by the determination portion 209 will be described.

First, in S41, the determination portion 209 calculates the deviations in the lateral direction and the yaw direction between the traveling trajectory estimated in S2 and the link shape in the target section in the map data acquired by the map data acquisition portion 202. In S42, when both of the deviations in the lateral direction and the yaw direction are equal to or higher than the threshold (YES in S42), the process shifts to S43. In S43, the traveling trajectory estimated in S2 is determined to be not used for estimating the traveling lane of the subject vehicle by the traveling lane estimation portion 210, and the process shifts to S5. In this case, for example, the use permission flag may be turned off. For the front vehicle showing the traveling trajectory of which deviations in the lateral direction and the yaw direction are equal to or higher than the threshold, a lane changing flag indicating that the lane is being changed may be turned on. The lane changing flag is set to an off-state as the default state.

Figure 10:
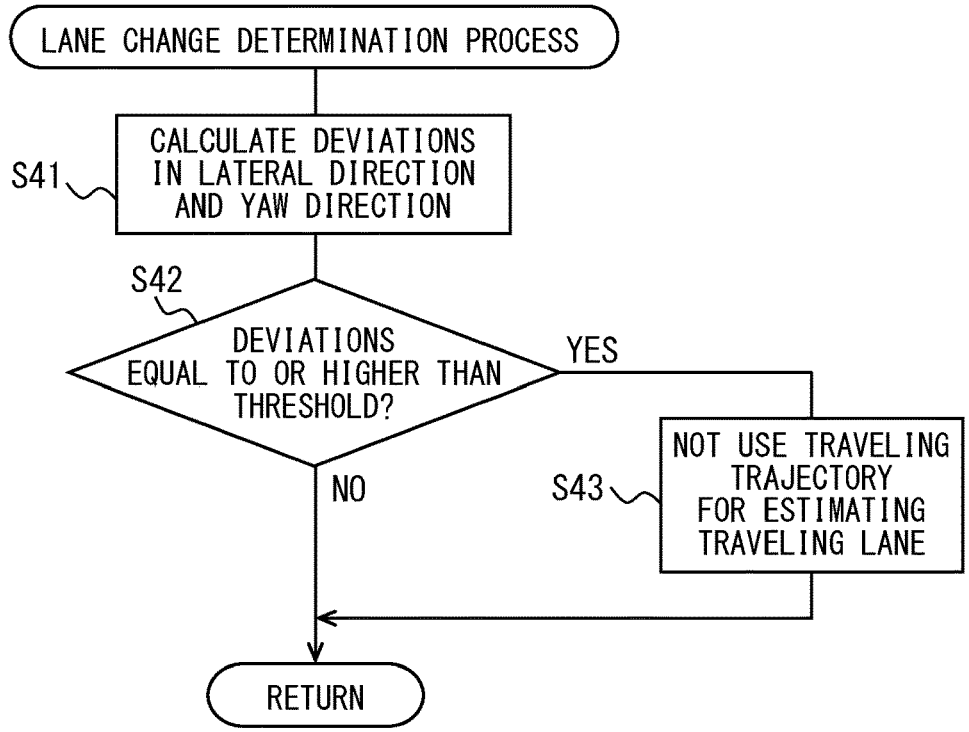
FIG. 10 is a flowchart showing one example of a lane change determination process by the determination portion.

On the other hand, when the lateral direction deviation and the yaw direction deviation that are calculated in S41 are less than the threshold value (NO in S42), the traveling trajectory estimated in S2 is not determined to be not used for estimating the traveling lane of the subject vehicle by the traveling lane estimation portion 210, and the process shifts to S5. Here, when the use permission flag is the on-state, the use permission flag is maintained. On the other hand, when the process of the flowchart in FIG. 8 is repeated, thereby the process of the flowchart in FIG. 10 is also repeated, and the use permission flag has been already changed from the on-state to the off-state, the availability flag is turned on. For the front vehicle of which lane changing flag has been turned on, the lane changing flag is turned off. For the front vehicle of which state of the lane change flag is switched from the on-state to the off-state, the lane number may be updated in accordance with the lane change.

Thereby, it can be determined that the traveling trajectory that is not used for estimating the traveling lane of the subject vehicle by the traveling lane estimation portion 210 is the traveling trajectory in the section where the lateral direction deviation and the yaw direction deviation that are calculated in S41 are equal to or more than the threshold. The traveling trajectory estimation performed from the time of turning off the availability flag to the time of turning on the availability flag may be reset when the availability flag is switched from the off-state to the on-state.

Returning to FIG. 8, in S5, the determination portion 209 executes a continuous straddle determination process, and the process shifts to S6. Here, with reference to a flowchart of FIG. 11, one example of the continuous straddle determination process by the determination portion 209 will be described.

First, in S51, the first lane marking estimation portion 206 and/or the second lane marking estimation portion 208 estimates the traveling lane marking position. In S52, the determination portion 209 compares the traveling trajectory estimated in S2 with the traveling lane marking position estimated in S51. When the distance at which the degree of proximity between the traveling trajectory estimated in S2 and the traveling lane marking position estimated in S51 is equal to or higher than the threshold is equal to or higher than the prescribed distance (YES in S52), the process shifts to S53. In S53, the traveling trajectory estimated in S2 is determined to be not used for estimating the traveling lane of the subject vehicle by the traveling lane estimation portion 210, and the process shifts to S6. In this case, for example, the use permission flag may be turned off.

Figure 11:
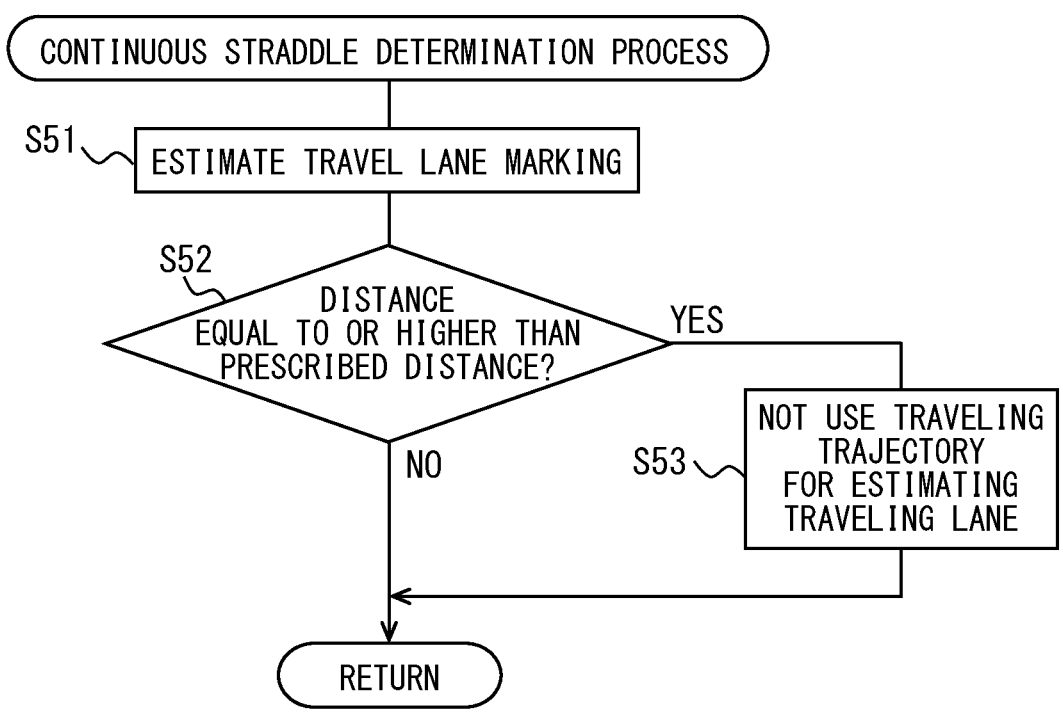
FIG. 11 is a flowchart showing one example of a flow of a continuous straddle determination process by the determination portion.

On the other hand, when the distance at which the degree of proximity between the traveling trajectory estimated in S2 and the traveling lane marking position estimated in S51 is equal to or higher than the threshold is not equal to or higher than the prescribed distance (NO in S52), it is not determined that the traveling trajectory estimated in S2 is not used for estimating the traveling lane of the subject vehicle by the traveling lane estimation portion 210. The process shifts to S6. Here, when the use permission flag is in the on-state, the use permission flag is maintained. On the other hand, when the process of the flowchart in FIG. 8 is repeated, thereby the process of the flowchart in FIG. 11 is also repeated, and the state of the use permission flag has been already changed from the on-state to the off-state, the availability flag is turned on.

Figure 8:
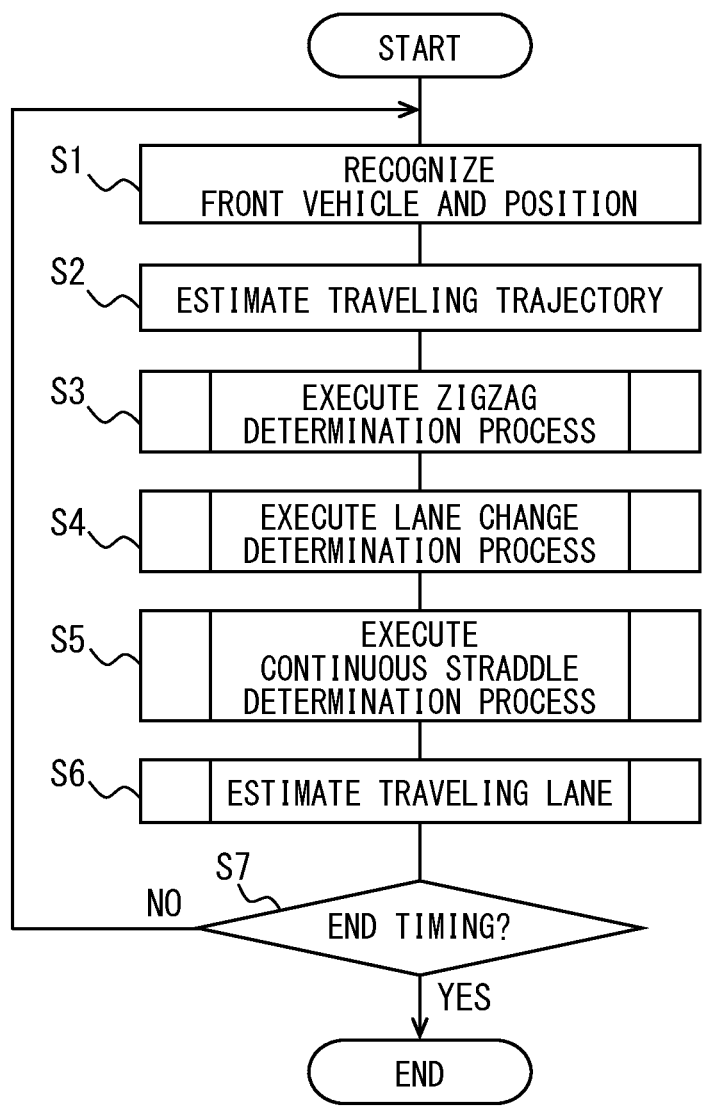
FIG. 8 is a flowchart showing one example of a flow of a traveling lane estimation process by a subject vehicle lane estimation portion.
Figure 9:
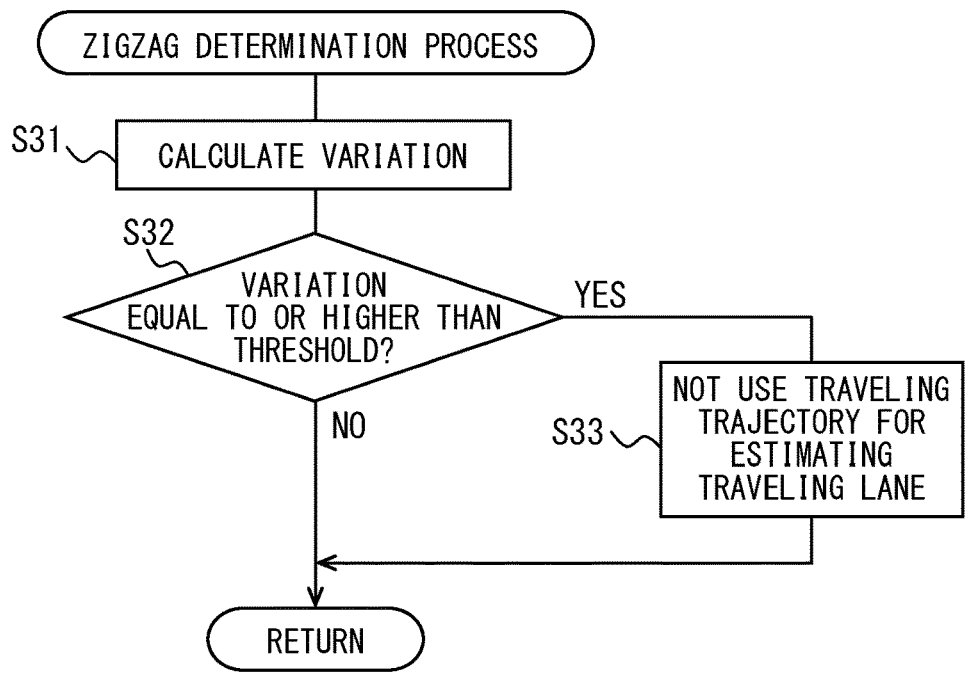
FIG. 9 is a flowchart showing one example of a flow of a zigzag determination process by a determination portion.

The flowchart of FIG. 8 has shown the example of the configuration of executing the zigzag determination process in S3, the lane change discrimination process in S4, and the continuous straddle determination process in S5 in this order. However, it is not limited to this. For example, the processes in S3 to S5 may be executed in a different order or in parallel.

Returning to FIG. 8, in S6, the traveling lane estimation portion 210 estimates the traveling lane of the subject vehicle by using the traveling trajectory of which use permission flag is turned on without using the traveling trajectory of which use permission flag is turned off among the front vehicle traveling trajectories estimated by the trajectory estimation portion 205.

In S7, when the timing is an end timing of the traveling lane estimation process (YES in S7), the traveling lane estimation process ends. On the other hand, when the timing is not the end timing of the traveling lane estimation process (NO in S7), the process returns to S1 and is repeated. One example of the end timing of the traveling lane estimation process includes a case where the power switch of the subject vehicle is turned off, or the like.

The flowchart in FIG. 8 has shown the example of the configuration of discerning the traveling trajectory during the zigzag traveling and the traveling trajectory during the lane change and determining the inappropriate traveling trajectory for estimating the traveling lane of the subject vehicle. However, it is not limited to this. For example, it may be determined that the traveling trajectory is inappropriate for estimating the traveling lane of the subject vehicle without discerning the traveling trajectory during the zigzag traveling and the traveling trajectory during the lane change.

The flowchart in FIG. 8 has shown the example of the configuration of determining that the traveling trajectory during the zigzag traveling, the traveling trajectory during the lane change, and the traveling trajectory during the continuous straddle traveling are inappropriate for estimating the traveling lane of the subject vehicle. However, it is not limited to this. For example, it may be determined that a part of the traveling trajectory during the zigzag traveling and the traveling trajectory during the continuous straddle traveling is inappropriate for estimating the traveling lane of the subject vehicle.

According to the configuration of the first embodiment, it may be possible to estimate which of the multiple lanes is the traveling lane of the subject vehicle by using the target lane number information and the lateral direction positional relationship. Since the traveling trajectory of the front vehicle is used, even in the section where it is difficult to recognize the traveling lane marking type based on the image recognition process of the camera image, it may be possible to estimate the traveling lane of the subject vehicle. Further, since the traveling trajectory other than the traveling trajectory determined to be inappropriate for estimating the traveling lane of the subject vehicle is used, it may be possible to prevent the decrease in the estimation accuracy of the traveling lane of the subject vehicle due to the traveling trajectory determined to be inappropriate for estimating the traveling lane of the subject vehicle. As the result, even in the section where it is difficult to recognize the traveling lane marking type based on the image recognition process of the camera image, it may be possible to more accurately estimate the traveling lane of the subject vehicle.

Second Embodiment

The first embodiment has shown the configuration of determining that the traveling trajectory during the lane change is the inappropriate traveling trajectory for estimating the traveling lane of the subject vehicle. However, it is not necessarily limited to this. For example, a configuration (hereinafter, second embodiment) that does not determine that the traveling trajectory during the lane change is the inappropriate traveling trajectory for estimating the traveling lane of the subject vehicle may be employed. The driving assist system 1 of the second embodiment is similar to the driving assist system 1 of the first embodiment except that a subject vehicle lane estimation portion 200a is included instead of the subject vehicle lane estimation portion 200.

Figure 12:
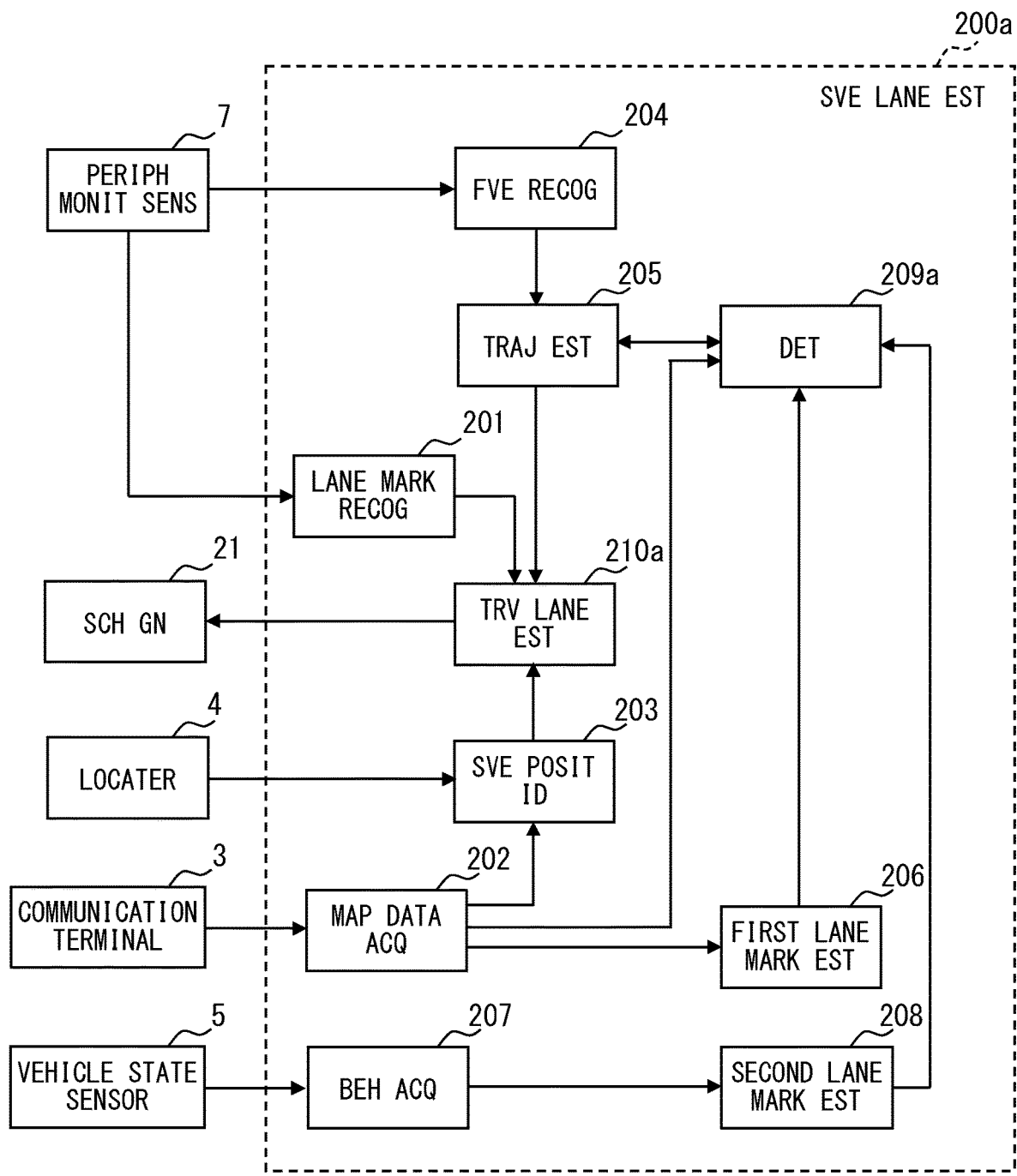
FIG. 12 is a diagram showing one example of a schematic communication of the subject vehicle lane estimation portion.

Here, a schematic configuration of the subject vehicle lane estimation portion 200a will be described with reference to FIG. 12. As shown in FIG. 12, the subject vehicle lane estimation portion 200a includes the lane marking recognition portion 201, the map data acquisition portion 202, the subject vehicle position identification portion 203, the front vehicle recognition portion 204, the trajectory estimation portion 205, the first lane marking estimation portion 206, the behavior acquisition portion 207, the second lane marking estimation portion 208, a determination portion 209a, and a traveling lane estimation portion 210a, as functional blocks. The subject vehicle lane estimation portion 200a is similar to the subject vehicle lane estimation portion 200 of the first embodiment except that the determination portion 209a and the traveling lane estimation portion 210a are included instead of the determination portion 209 and the traveling lane estimation portion 210.

The determination portion 209a is similar to the determination portion 209 of the first embodiment except that the traveling trajectory during the lane change is determined to be the inappropriate traveling trajectory for estimating the traveling lane of the subject vehicle. The determination portion 209a discerns the traveling trajectory during the zigzag traveling and the traveling trajectory during the lane change and determines that the traveling trajectory during the zigzag traveling is the inappropriate traveling trajectory for estimating the traveling lane of the subject vehicle. However, the determination portion 209a does not determine that the traveling trajectory during the lane change is the inappropriate traveling trajectory for estimating the traveling lane of the subject vehicle.

The traveling trajectory during the zigzag traveling and the traveling trajectory during the lane change may be discerned by the similar configuration to the configuration described in the first embodiment or a different method. For example, the traveling trajectory during the zigzag traveling and the traveling trajectory during the lane change may be discerned based on the lateral direction deviation and the yaw direction deviation between the front vehicle traveling trajectory estimated by the trajectory estimation portion 205 and the link shape of the target section in the map data acquired by the map data acquisition portion 202. As one example, when the lateral direction deviation and the yaw direction deviation are equal to or more than the threshold, the traveling trajectory may be determined as the traveling trajectory during the lane change, and when the lateral direction deviation and the yaw direction deviation are less than the threshold, the traveling trajectory may be determined as the traveling trajectory during the zigzag traveling.

The traveling trajectory during the lane change may cause the erroneous estimation of the traveling lane of the subject vehicle when being directly associated with one lane among multiple lanes indicated by the traveling lane number information. However, the traveling trajectory during the lane change is used for discerning the traveling trajectory before the lane change and traveling trajectory after the lane change, and thereby there is an advantage that multiple lane positions can be identified from the traveling trajectory of one front vehicle. Accordingly, although the determination portion 209 does not determine that traveling trajectory during the lane change is inappropriate for estimating the traveling lane of the subject vehicle, the determination portion 209 determines the range of the traveling trajectory during the lane change so that the range can be used by the traveling lane estimation portion 210a.

The traveling lane estimation portion 210a is similar to the traveling lane estimation portion 210 of the first embodiment except that the traveling lane of the subject vehicle is estimated based on the traveling trajectory during the lane change. The traveling lane estimation portion 210a determines that the front vehicle traveling trajectory estimated by the trajectory estimation portion 205 is the traveling trajectory before the lane change or the traveling trajectory after the lane change based on the range of the traveling trajectory during the lane change identified by the determination portion 209a. The traveling lane estimation portion 210a associates the traveling trajectory before the lane change and the traveling trajectory after the lane change with each of the multiple lanes indicated by the traveling lane number information, and estimates the traveling lane of the subject vehicle in the similar manner described in the first embodiment.

According to the configuration of the second embodiment, it may be possible to identify the positions of the multiple lanes based on the traveling trajectory of one front vehicle by using the traveling trajectory during the lane change. Therefore, even when there are fewer vehicles in front of the subject vehicle, it may be possible to more accurately estimate the traveling lane of the subject vehicle.

Third Embodiment

The embodiment described above has shown the example in the case where the lane marking recognition portion 201 cannot recognize the traveling lane marking, and the traveling lane of the subject vehicle is estimated based on the traveling trajectory of the front vehicle. However, it is not limited to this. For example, even when the lane marking recognition portion 201 can recognize the traveling lane marking, the traveling lane of the subject vehicle may be estimated based on the traveling trajectory of the front vehicle. In this case, the estimation accuracy of the traveling lane of the subject vehicle may be improved by using each other in a reinforcing manner, or the like.

Fourth Embodiment

The embodiment described above has shown the example in the case where the traveling lane of the subject vehicle is estimated based on the traveling lane marking recognized by the lane marking recognition portion 201. However, it is not limited to this. For example, the traveling lane marking recognized by the lane marking recognition portion 201 may not be used. In this configuration, when the traveling lane of the subject vehicle cannot be estimated based on the traveling lane number information and the lateral direction positional relationship, it may be temporarily assumed that the subject vehicle is positioned in a traveling lane provisionally identified by the subject vehicle position identification portion 203. When the traveling lane of the subject vehicle can be estimated based on the traveling lane number information and the lateral direction positional relationship, the estimation result of the traveling lane of the subject vehicle may be updated.

It is noted that a flowchart or the process of the flowchart in the present disclosure includes multiple steps (also referred to as sections), each of which is represented, for example, as S1. Further, each step can be divided into several sub-steps while several steps can be combined into a single step.

While various embodiments, configurations, and aspects of the traveling lane estimation apparatus, the traveling lane estimation method, the control program, and the computer readable non-temporary storage medium according to one aspect of the present disclosure have been exemplified, the embodiments, configurations, and aspects of the present disclosure are not limited to those described above. For example, embodiments, configurations, and examples obtained from an appropriate combination of technical elements disclosed in different embodiments, configurations, and examples are also included within the scope of the embodiments, configurations, and examples of the present disclosure.

The invention claimed is:
1. A traveling lane estimation apparatus comprising:
a front vehicle recognition portion configured to recognize a front vehicle in front of a subject vehicle based on a sensing result by a periphery monitoring sensor that is mounted on a vehicle and is configured to monitor a periphery of the subject vehicle;
a trajectory estimation portion configured to estimate a front vehicle traveling trajectory based on a front vehicle position sequentially recognized by the front vehicle recognition portion;
a map data acquisition portion configured to acquire map data including lane number information;
a subject vehicle identification portion configured to identify a subject vehicle position on a map based on the map data acquired by the map data acquisition portion;
a traveling lane estimation portion configured to estimate a traveling lane of the subject vehicle based on
the lane number information that is included in the map data acquired by the map data acquisition portion and corresponds to the subject vehicle position identified by the subject vehicle position identification portion and a lateral direction positional relationship of the subject vehicle position identified by the subject vehicle position identification portion with respect to the front vehicle traveling trajectory estimated by the traveling trajectory estimation portion; and a determination portion configured to determine an inappropriate traveling trajectory for estimating the subject vehicle traveling lane by the traveling lane estimation portion, wherein:

the traveling lane estimation portion is configured to estimate the subject vehicle traveling lane without using a traveling trajectory that is the front vehicle traveling trajectory estimated by the trajectory estimation portion and is determined to be inappropriate by the determination portion.

2. The traveling lane estimation apparatus according to claim 1, wherein:

when a variation of a point group of the front vehicle position used for estimating, by the trajectory estimation portion, the front vehicle traveling trajectory is equal to or higher than a threshold, the determination portion determines the front vehicle traveling trajectory as the inappropriate traveling trajectory for estimating the subject vehicle traveling lane.

3. The traveling lane estimation apparatus according to claim 1, wherein:

the map data acquisition portion is configured to acquire the map data further including a link shape; and when a deviation degree between the front vehicle traveling trajectory estimated by the trajectory estimation portion and a link shape of a section including an estimated traveling trajectory in the map data acquired by the map data acquisition portion is equal to or higher than a threshold, the determination portion determines that the front vehicle traveling trajectory is the inappropriate traveling trajectory for estimating the subject vehicle traveling lane.

4. The traveling lane estimation apparatus according to claim 1, wherein:

the map data acquisition portion is configured to acquire the map data further including a link shape;

in a case where zigzag traveling in an identical lane and lane change in the identical lane are discerned based on the deviation degree between the front vehicle traveling trajectory estimated by the trajectory estimation portion and the link shape of a section including the estimated traveling trajectory in the map data acquired by the map data acquisition portion, when traveling in the identical lane is determined as the zigzag traveling, the determination portion determines the front vehicle traveling trajectory as the inappropriate traveling trajectory for estimating the subject vehicle traveling lane, and when the traveling is determined as the lane change, the determination portion does not determine the traveling trajectory as the inappropriate traveling trajectory for estimating the subject vehicle traveling lane.

5. The traveling lane estimation apparatus according to claim 1, wherein:

the map data acquisition portion is configured to acquire the map data further including a link shape;

the traveling lane estimation apparatus further includes a first lane marking estimation portion configured to estimate a traveling lane marking position based on the link shape in the map data acquired by the map data acquisition portion; and when a distance causing a proximity degree between the front vehicle traveling trajectory estimated by the trajectory estimation portion and the position of the traveling lane marking estimated by the first lane marking estimation portion to be equal to or higher than the threshold is equal to or higher than a prescribed distance, the determination portion determines the front vehicle traveling trajectory as the inappropriate traveling trajectory for estimating the subject vehicle traveling lane.

6. The traveling lane estimation apparatus according to claim 1, further comprising:

a behavior acquisition portion configured to acquire a sensing result by a behavior sensor configured to detect a physical state quantity related to a behavior of the subject vehicle; and a second lane marking estimation portion configured to estimate the traveling lane marking position of the subject vehicle traveling lane based on the sensing result sequentially acquired by the behavior acquisition portion, wherein:

when a distance at which a proximity degree between the front vehicle traveling trajectory estimated by the trajectory estimation portion and the traveling lane marking position estimated by the second lane marking estimation portion is equal to or higher than the threshold is equal to or higher than a prescribed distance, the determination portion determines the traveling trajectory as the inappropriate traveling trajectory for estimating the subject vehicle traveling lane.

7. The traveling lane estimation apparatus according to claim 1, further comprising:

a lane marking recognition portion configured to recognize a traveling lane marking based on the sensing result by the periphery monitoring sensor configured to monitor the periphery of the subject vehicle, wherein:

when the lane marking recognition portion recognizes the traveling lane marking, the determination portion estimates the subject vehicle traveling lane based on the traveling lane marking recognized by the lane marking recognition portion; when the lane marking recognition portion does not recognize the traveling lane marking, the traveling lane estimation portion estimates the subject vehicle traveling lane based on a recognized traveling lane marking, the lane number information corresponding to the subject vehicle position identified by the subject vehicle position identification portion in the map data acquired by the map data acquisition portion, and a lateral direction positional relationship of the subject vehicle position identified by the subject vehicle position identification portion with respect to the front vehicle traveling trajectory estimated by the trajectory estimation portion.

8. A traveling lane estimation method comprising:

recognizing a front vehicle in front of a subject vehicle based on a sensing result by a periphery monitoring sensor that is mounted on a vehicle and is configured to monitor a periphery of the subject vehicle;

estimating a front vehicle traveling trajectory based on a front vehicle position that is sequentially recognized;

acquiring map data including lane number information;

identifying a subject vehicle position on a map based on acquired map data;

determining an inappropriate traveling trajectory for estimating the subject vehicle traveling lane; and estimating the subject vehicle traveling lane based on
- the lane number information that is included in acquired map data and corresponds to an identified subject vehicle position and
- a lateral direction positional relationship of the identified subject vehicle position with respect to a traveling trajectory that is an estimated front vehicle traveling trajectory and is other than the inappropriate traveling trajectory for estimating the subject vehicle traveling lane.

9. A computer-readable non-temporary storage medium storing a control program configured to cause a computer to:
- recognize a front vehicle in front of a subject vehicle based on a sensing result by a periphery monitor sensor configured to monitor a periphery of the subject vehicle;
- estimate a front vehicle traveling trajectory based on a front vehicle position sequentially that is recognized;
- acquire map data including lane number information;
- identify a subject vehicle position on a map based on acquired map data;
- determine an inappropriate traveling trajectory for estimating the subject vehicle traveling lane; and
- estimate a traveling lane of the subject vehicle based on
  - the lane number information that is included in the acquired map data and corresponds to an identified subject vehicle position and
  - a lateral direction positional relationship of the identified subject vehicle position with respect to a traveling trajectory that is an estimated front vehicle traveling trajectory and is other than the inappropriate traveling trajectory determined to be inappropriate.

10. The traveling lane estimation apparatus according to claim 1, wherein:
a processor corresponds to the front vehicle recognition portion, trajectory estimation portion, map data acquisition portion, subject vehicle identification portion, traveling lane estimation portion, and determination portion.

11. The traveling lane estimation apparatus according to claim 5, wherein:
the processor further corresponds to first lane marking estimation portion.

12. The traveling lane estimation apparatus according to claim 1, wherein:
the processor corresponds to the behavior acquisition portion and the second lane marking estimation portion.

13. The traveling lane estimation apparatus according to claim 1, wherein:
the processor corresponds to the lane marking recognition portion.

* * * * *